US008745502B2

(12) United States Patent
Snibbe et al.

(10) Patent No.: US 8,745,502 B2
(45) Date of Patent: Jun. 3, 2014

(54) SYSTEM AND METHOD FOR INTERFACING INTERACTIVE SYSTEMS WITH SOCIAL NETWORKS AND MEDIA PLAYBACK DEVICES

(75) Inventors: Scott S. Snibbe, San Francisco, CA (US); Alan T. Shimoide, San Francisco, CA (US)

(73) Assignee: Snibbe Interactive, Inc., San Francisco, CA (US)

( * ) Notice: Subject to any disclaimer, the term of this patent is extended or adjusted under 35 U.S.C. 154(b) by 1168 days.

(21) Appl. No.: 12/313,031

(22) Filed: Nov. 13, 2008

(65) Prior Publication Data

US 2010/0122174 A1     May 13, 2010

Related U.S. Application Data

(60) Provisional application No. 61/130,188, filed on May 28, 2008.

(51) Int. Cl.
*G06F 3/0481*     (2013.01)

(52) U.S. Cl.
USPC ............ 715/733; 715/723; 715/716; 235/383

(58) Field of Classification Search
CPC .................................................... G06F 3/0481
USPC ........................................................ 715/733
See application file for complete search history.

(56) References Cited

U.S. PATENT DOCUMENTS

| | | | |
|---|---|---|---|
| 4,358,824 A | 11/1982 | Glickman et al. | |
| 4,425,586 A | 1/1984 | Miller | |
| 4,817,050 A | 3/1989 | Komatsu et al. | |
| 4,843,568 A | 6/1989 | Krueger et al. | |
| 6,166,729 A | 12/2000 | Acosta et al. | |
| 6,549,922 B1 * | 4/2003 | Srivastava et al. | 1/1 |
| 6,585,521 B1 * | 7/2003 | Obrador | 434/236 |
| 6,968,366 B1 | 11/2005 | Zhang et al. | |
| 6,976,032 B1 * | 12/2005 | Hull et al. | 1/1 |
| 7,069,308 B2 | 6/2006 | Abrams | |
| 7,117,254 B2 * | 10/2006 | Lunt et al. | 709/218 |
| 7,249,123 B2 * | 7/2007 | Elder et al. | 1/1 |
| 7,389,917 B2 * | 6/2008 | Abraham et al. | 235/382 |
| 7,945,653 B2 * | 5/2011 | Zuckerberg et al. | 709/223 |
| 2001/0039571 A1 | 11/2001 | Atkinson | |
| 2004/0064833 A1 * | 4/2004 | Lee et al. | 725/42 |
| 2005/0064926 A1 * | 3/2005 | Walker et al. | 463/16 |
| 2006/0041542 A1 * | 2/2006 | Hull et al. | 707/3 |
| 2006/0095331 A1 * | 5/2006 | O'Malley et al. | 705/22 |
| 2006/0206580 A1 * | 9/2006 | Johnson | 709/217 |
| 2006/0256937 A1 * | 11/2006 | Foreman et al. | 379/88.08 |
| 2007/0118525 A1 * | 5/2007 | Svendsen | 707/9 |
| 2007/0118609 A1 | 5/2007 | Mullan et al. | |

(Continued)

*Primary Examiner* — William Bashore
*Assistant Examiner* — Reza Nabi
(74) *Attorney, Agent, or Firm* — Van Pelt, Yi & James LLP

(57) ABSTRACT

A system and method for interfacing interactive systems with social networks and media playback devices is described. For example, a system for generating and interacting with media content is described. In one embodiment, the system includes an interactive system that displays media content, wherein the interactive system includes a first computer and sensors for recording a user's interaction with the displayed media content, and a kiosk that allows a user to share the interactive media content with social networks and media playback devices, wherein the interactive media content includes the media content and metadata representing the user's recorded interaction with the media content.

67 Claims, 9 Drawing Sheets

(56) References Cited

U.S. PATENT DOCUMENTS

| | | | |
|---|---|---|---|
| 2007/0159651 A1* | 7/2007 | Disario et al. | 358/1.15 |
| 2007/0255754 A1* | 11/2007 | Gheel | 707/104.1 |
| 2007/0271338 A1* | 11/2007 | Anschutz | 709/204 |
| 2008/0086458 A1* | 4/2008 | Robinson et al. | 707/3 |
| 2008/0091723 A1* | 4/2008 | Zuckerberg et al. | 707/104.1 |
| 2008/0092156 A1* | 4/2008 | Ferrone | 725/13 |
| 2008/0177618 A1* | 7/2008 | Funge et al. | 705/10 |
| 2008/0194270 A1* | 8/2008 | Greenberg | 455/456.1 |
| 2008/0262908 A1* | 10/2008 | Broady et al. | 705/14 |
| 2008/0274798 A1* | 11/2008 | Walker et al. | 463/25 |
| 2008/0317439 A1* | 12/2008 | Wong et al. | 386/124 |
| 2008/0320037 A1* | 12/2008 | MacGuire et al. | 707/103 R |
| 2009/0116812 A1* | 5/2009 | O'Brien et al. | 386/52 |
| 2009/0150397 A1* | 6/2009 | Chen et al. | 707/9 |
| 2009/0157680 A1* | 6/2009 | Crossley et al. | 707/6 |
| 2010/0293466 A1* | 11/2010 | O'Brien | 715/723 |
| 2011/0026839 A1* | 2/2011 | Bogart et al. | 382/217 |
| 2011/0161293 A1* | 6/2011 | Vermeulen et al. | 707/626 |

* cited by examiner

SYSTEM AND METHOD FOR INTERFACING INTERACTIVE SYSTEMS WITH SOCIAL NETWORKS AND MEDIA PLAYBACK DEVICES

CROSS REFERENCE TO OTHER APPLICATIONS

This application claims priority to U.S. Provisional Patent Application No. 61/130,188 entitled "System and Method for Interfacing Interactive Systems with Social Networks and Media Playback Devices" filed May 28, 2008, which is incorporated herein by reference for all purposes.

BACKGROUND OF THE INVENTION

Media playback systems allow users to view media and/or multimedia. Multimedia (also referred to herein as media) is media and content that utilizes a combination of different content forms. Multimedia can include, for example, a combination of text, audio, still images, animation, video, and interactivity content forms. Multimedia is usually recorded and played, displayed or accessed by information content processing devices, such as computerized and electronic devices, but can also be part of a live performance. Media playback systems include electronic media devices used to store and experience multimedia content. The term "rich media" is often used synonymously to refer to interactive multimedia. Hypermedia is an example multimedia application.

Social networks, such as Facebook and MySpace, allow users to interact or socialize with other users. A social network is a social structure made of nodes (which are generally users or organizations) that are tied by one or more specific types of interdependency, such as values, visions, ideas, financial exchange, friendship, and/or trade. The resulting graph-based structures are often very complex.

BRIEF DESCRIPTION OF THE DRAWINGS

Various embodiments of the invention are disclosed in the following detailed description and the accompanying drawings.

DETAILED DESCRIPTION

Figure 1:
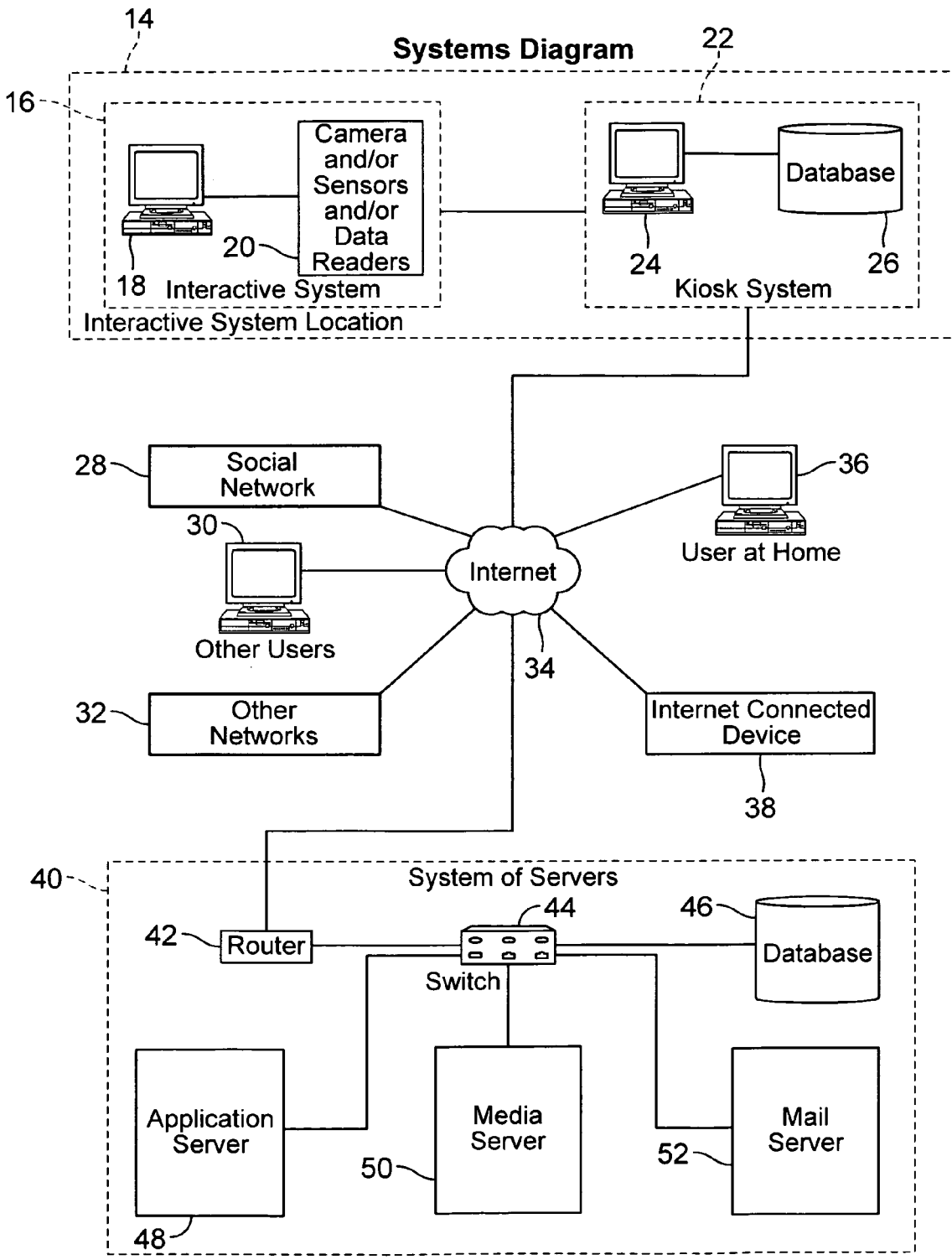
FIG. 1 is a block diagram illustrating an embodiment of a system for an interactive system and kiosk system in network communication with a social network and a media playback device.

The invention can be implemented in numerous ways, including as a process; an apparatus; a system; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Interactive systems that include a computer responding to unencumbered users using a camera as described by Myron Krueger in U.S. Pat. No. 4,843,568 exist in many locations and are used for advertising, entertainment, education, and other purposes. Other such interactive systems such as photograph capturing and editing systems, sensor based interactive systems, such as systems that are commonly found in museums, also exist. Interactive systems create a physical and social connection between users, other users using these systems, and the system itself. These social connections and experiences are directly tied to the physical embodiment of the system or physical representations of generated media. However, users are unable to share their experiences to a larger community of users. Social networks for sharing experiences, photographs, videos, and audio to large networked communities on the Internet also exist. However, no system or method exists for sharing experiences as media from physical interactive systems to other users, devices, and/or social networks.

What is needed is a system and method that allows user to share his or her experience and media from interactive systems with other users, devices, and/or social networks.

In one embodiment, a system and method for interfacing interactive systems, such as interactive video based computer systems or interactive photographic capture devices or other interactive devices, with Web-based social networks and media playback devices, such as Internet enabled devices or other devices promoting social interactions with interactive systems, is described. For example, a computer system collects video, digital photographs or data from interactive systems. In one embodiment, a computer collects email addresses and also allows users to select data or videos or photos to share with a web-based social network and sends this data along with descriptive metadata to a remotely located computer or system of computers. The user then receives an email with a link to access the data online. In one embodiment, the collected data and metadata is sent directly to a remotely located computer or system of computers. The remotely located computer or system of computers stores this data. In one embodiment, data from these interactive systems can be viewed, analyzed, or be interacted with online. For example, users are able to view and access the data by visiting an online website. The user has the option to download, edit, and or share this data with other users, devices, other networks, and various social networks. Accordingly, users can share their experiences with others and can also add comments to shared interactive media content.

In one embodiment, the present invention permits a user using an interactive system to share the physical and social experience as recorded media such as, for example, video, photographs, sound, and/or data and associated metadata with other users, devices, and social networks that are connected by the Internet. The metadata stores key information relating the physical experience and location of the interactive system to the user and to the stored media. The invention permits the user to comment, visualize, and/or modify the media representing the physical experience of the interactive system before sharing.

In one embodiment, the physical experience of using an interactive system is captured as media and stored in a database. A user is able to browse and select recorded media to share using a kiosk. The user can then enter an email address so that he or she can view, modify, and share his or her experience from, for example, home or another network connected device. The user receives an email with a link that permits them to visualize, modify, and further share the media with social networks, other users by email, other networks, other devices (e.g., using web pages customized for specific devices).

In one embodiment, a data reader can be used to collect information of the user using the interactive system instead of, or in addition to, having the user enter an email address. Data readers include, for example, bar code readers, magnetic card readers, biometric identification readers, and/or radio frequency identification (RFID) readers. This data from the data reader is stored, for example, as metadata associated with the media.

In one embodiment, a data reader (e.g., biometric identification reader such as fingerprint, iris, DNA or other type of reader) can be used to identify a user that is using the interactive system and to associate this user with an email address stored in a database instead of having the user enter an email address.

In one embodiment, the encoded media and metadata is transferred from the interactive system (e.g., immersive system) directly to a server or a system of servers. A user is able to browse, visualize, select, and/or share the media by accessing a web page associated with the location of the interactive system or interactive system sponsor or an event associated with the interactive system or interactive system maker.

In one embodiment, multiple kiosks for browsing the media are connected to a kiosk server that stores and serves the media and associated metadata. The multiple kiosks allow for several users to browse and share media from the interactive system simultaneously.

In one embodiment, an interactive system is connected to multiple kiosk systems, without requiring a separate kiosk server, and the media and associated metadata are stored on each kiosk separately.

In one embodiment, multiple interactive systems are connected to a kiosk system (e.g., kiosk). The multiple interactive systems can be related to each other, but such is not required. A user can view and select media to share, from the multiple interactive systems, at a kiosk.

In one embodiment, multiple interactive systems are connected to a kiosk server that stores and serves the media and metadata of the multiple interactive systems. Multiple kiosks for browsing and selecting the media can be connected to the kiosk server to allow several users to view and select media to share, from the multiple interactive systems.

FIG. 1 is a block diagram illustrating an embodiment of a system for an interactive system in network communication with a social network and a media playback device. In one embodiment, the system interfaces interactive system 16, such as interactive video based computer systems or interactive photographic capture devices, with Web-based social network 28 and media playback device, such as home computer 36 and/or Internet connected device 38. As shown in FIG. 1, interactive system 16 and kiosk system 22 (also referred to herein as kiosk) are located at interactive system location 14 (e.g., public venues of entertainment, education, retail, and other such public spaces; as well as private commercial and private residential spaces), which allows users to interact with media content using interactive system 16. Interactive system 16 includes a computer system 18 in communication with sensors (e.g., a camera, a microphone, a tactile sensor, a heat sensor, a motion sensor, or any other device capable of sensing a user's physical or virtual interaction with displayed media content) and/or data readers (e.g., bar code, magnetic card, biometric identification, and/or radio frequency identification (RFID) readers) 20. For example, interactive system 16 can include an interactive video based computer system or interactive photographic capture device, in which a user's interactions with the displayed video and/or graphical image can be recorded in a variety of ways, such as an video and/or image overlay, audio input, textual input, or any other audio, graphical, visual, or other sense based interaction that is detected by the interactive system's sensors. Computer system 18 responds to the interaction using a monitor, projector, speakers, and/or other devices that provide visual, auditory, EEG/brain wave signals, and/or tactile feedback. In one embodiment, the interaction is unencumbered through sensor 20 (e.g., a camera). In one embodiment, it is not necessary for unencumbered interaction, and interaction can be through; for example, wired controllers, touch sensitive systems, and/or other interfaces including data acquiring devices (e.g., data readers 20). A user's physical interaction with interactive system 16 and his or her social interaction with other users of the system of FIG. 1 are captured as media by sensors 20. In one embodiment, a data reader 20 in network communication with interactive system 16 tracks usage data by users of the system, the tracked usage data can then be transmitted for displaying online, and the tracked usage data can include data such as the following: number of users, time usage per user, total time usage, time usage with specific media content by a user, level of activity by user interacting with media content, choices and or user profiles made by a user interacting with user interface elements, the interaction outcome (e.g., score, accumulated items, prizes, game state), social interaction, posture use, gesture use, velocity, race, age, gender, user garment brand related data, user jewelry related data, and emotion of users interacting with media content, stored as metadata associated with the interactive media content.

The media content (as used herein, media refers to media content and/or multimedia content) can be a video representing the user's actions within a context relevant to interactive system 16, such as the user represented in a simulation. For example, the media can be a photograph or video that is captured and modified or unmodified by the user or by the interactive system. The media can also be audio or data that is generated by the user and can be represented in some fashion such as but not limited to a simulation, an animation, a game, and/or analytical charts or graphs. Other examples of media include interactive video, user created video with an audio mix, tactile data, a video game, a music video, computer graphic data, three-dimensional motion-capture data, a digital photograph, a data visualization, environmental data, and recorded brain wave signals data. Information about the location or event of interactive system 14 along with other details of the media is stored as metadata (e.g., any type of data that describes the media content data, such as data representing the user's physical/virtual interaction with the media, or is associated with the media content data, such as user related information and/or location related information of where the interactive media was created and/or the interactive system used for creating the interactive media content) along with the media in a database 26 of kiosk system 22. Interactive system 16 and kiosk system 22 are connected by a communication network, such as a wide area network or local area network in network communication with Internet 34. Also, it will be apparent to those of ordinary skill in the art that a database, such as database 26, can include a database and database software for accessing and managing the database. For example, database 26 can be a relational database accessed using a well known Structured Query Language (SQL). Kiosk system 22 includes a computer 24, which provides access to database 26 and allows a user to browse and select his or her physical experience from interactive system 16. Kiosk 22 can be implemented as a single computer/computing system with/integrated with interactive system 16. In one embodiment, kiosk 22 is any system that allows a user to interact with interactive system 16 and can communicate with the Internet 34. For example, the user's interactions with the selected media content is recorded using camera/sensors 20 and stored in database 26 as interactive media content (also referred to herein as interactive media), which includes the media content and associated metadata that represents the recorded user interaction with the media content. The user can then select his or her interactive media for sharing with others, and kiosk 22 then collects the email address of the user and stores this email address as additional metadata associated with the media content. Kiosk 22 sends the interactive media to a system of servers 40 via the Internet 34 using, for example, the hypertext transfer protocol (HTTP) over secure socket layer (HTTPS) or using other well known protocols as will be apparent to one of ordinary skill in the art.

In one embodiment, a system of servers 40 allows for storing, browsing, modification, visualization, and sharing of the media content and metadata (e.g., interactive media) via the Internet 34. In one embodiment, system of servers 40 is implemented in one or more server computer(s) (e.g., a single server computer executing multiple applications and/or virtual machines for providing an application server, media server, mail server, and database access). As will be apparent to one of ordinary skill in the art, a router 42 forwards network packets for network communication and typically sends these packets to a switch 44 that allows (as shown) multiple servers and other devices to connect to the Internet 34 via the router 42. Database 46 stores shared media and associated metadata (e.g., interactive media).

In one embodiment, mail server 52 sends an email to the user whose email address is stored in the metadata of the interactive media that is to be shared. For example, this email includes a link to a web page that allows the user to access/view the interactive media, to optionally modify the interactive media, to comment on the interactive media, and to share the interactive media. The web page is served by application server 48, which serves as an application layer in one embodiment of the present invention. The application server 48 serves web pages in response to HTTP and HTTPS requests from remote clients including, for example, a user's computer, such as a user's home computer 36, and Internet enabled/connected device(s) 38 (e.g., a laptop computer, a mobile phone, a personal digital assistant (PDA), a media playback device, a video game/entertainment system, or any other portable device capable of displaying the interactive media and network communication with the Internet 34). By serving web pages, application server 48 provides a graphical user interface (GUI) to the system of servers 40 and the interactive media stored in database 46. A media server 50 provides the media content for this web page. In one embodiment, a media server 50 is any server or software executing on a computing device, such as a server, that is capable of serving media content, such as interactive media. Example publicly accessible media servers include Google Video, YouTube, Yahoo Video, and Flickr photo sharing, which are all commercially available Internet services. In one embodiment, media server 50 is a privately accessible/maintained media server for users with approved access only (e.g., users of the interactive system) and/or a publicly accessible media server.

In one embodiment, a user can use a web page to select how and with whom he or she will share the interactive media from his or her experience with interactive system 16. Once the user selects how he or she wants to share the interactive media, application server 48 sends the media and relevant metadata to a user selected social network 28 (e.g., Facebook, MySpace, and/or other social networks) and/or to other user selected networks 32, such as, for example, networks of interconnected devices. Application server 48 also allows the user to share the interactive media with Internet connected device(s) 38 by providing customized web pages with the interactive media that fit the screen format and resolution limitations of these devices, such as, for example, PDAs, media playback devices, and mobile phones. Additionally, application server 48 can provide a link to a downloadable version of the interactive media that can be trans-coded by media server 50 such that the media can be downloaded by a user at his or her home computer 36. The downloaded interactive media can then be transferred to and viewed on, for example, media playback devices. Additionally, mail server 52 can send emails to other users 30 with a link to view the interactive media. In one embodiment, a defined application programming interface (API) is used for searching stored interactive media (e.g., based on the media content itself and/or the associated metadata of the interactive media content). In one embodiment, a defined API is used for uploading interactive media content (e.g., to a social network).

One or more of the components and/or interactions between components may be optional and additional components not shown in FIG. 1 may be included. Those of ordinary skill in the art will recognize, for example, that computer 18 can be any computing device capable of displaying media, communicating with camera/sensors/data readers 20 for recording a user's interaction with the displayed media, and communicating with the Internet 34, including, for example, a general purpose computer (e.g., a PC or laptop executing a general purpose operating system such as Microsoft, Apple, Linux, and/or Unix operating systems; a video game/entertainment system, a PDA or smart phone device, or any other device capable of executing applications and communicating with the Internet). Similarly, computer 24 can be any computing device capable of allowing users to interact with interactive system 16 and communicating with the Internet 34, including, for example, a general purpose computer (e.g., a PC or laptop executing a general purpose operating system such as Microsoft, Apple, Linux, and/or Unix operating systems; a video game/entertainment system, a PDA or smart phone device, or any other device capable of executing applications and communicating with the Internet). In one embodiment, interactive system 16 and kiosk 22 are implemented as a combination of executable software executing on and devices connected to a single computer in communication with the Internet 34. Those of ordinary skill in the art will also recognize that system of servers 40 can be one or more computers or other computing devices capable of serving web pages, distributing and storing interactive media content, providing an email server, and communicating with the Internet 34.

Figure 2:
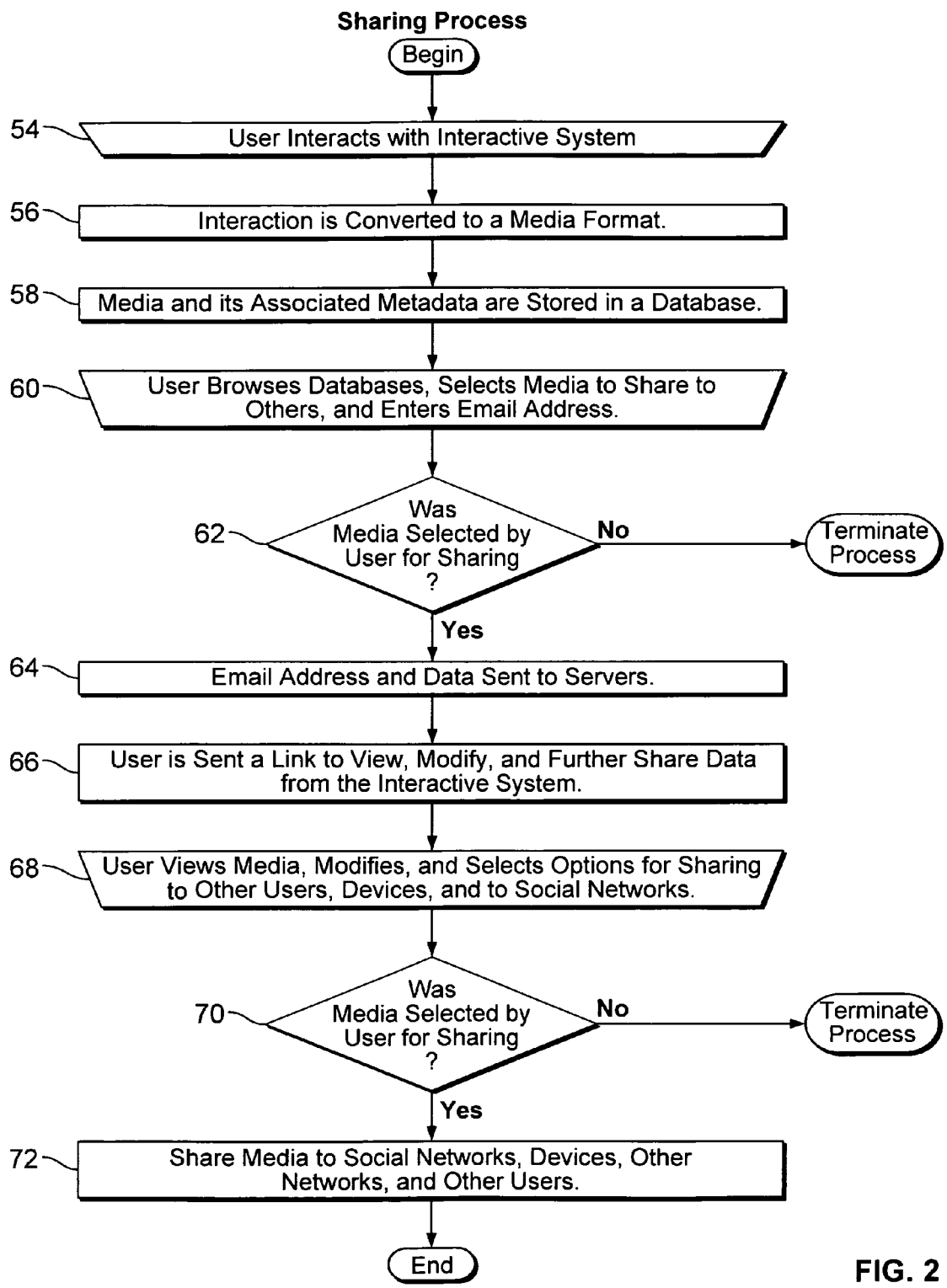
FIG. 2 is a flow diagram illustrating an embodiment of a process for connecting and sharing the physical experience of an interactive system with social networks and media playback devices.

FIG. 2 is a flow diagram illustrating an embodiment of a process for connecting and sharing the physical experience of an interactive system with social networks and media playback devices. As shown in FIG. 2 at 54, user interacts with an interactive system. At 56, this interaction is converted to a media format (e.g., the interaction can be recorded as metadata associated with the media content). At 58, metadata that relates the physical experience (e.g., the recorded user's interaction with the media) to the user is also stored with the media in a database. At 60, the user browses the database and selects interactive media for sharing using, for example, a kiosk (e.g., kiosk system 22 as described above with respect to the description of FIG. 1). The user can also enter his or her email address using the kiosk. At 62, if the interactive media is not selected for sharing, then the process can be terminated, and, for example, the interactive media can be deleted from the kiosk system at that time or after a predetermined period of time. At 64, if the user has selected media for sharing and has entered an email address, the media and metadata are distributed to a server system (e.g., system of servers 40 as described above with respect to the description of FIG. 1). In one embodiment, the interactive media is uploaded to the user's selected social network without requiring the user to enter an email address. For example, the user enters his or her login for their selected social network, such as a YouTube or Facebook login, and the interactive content is uploaded to that network. In one embodiment, information from the user's social network (e.g., networks of friends) is used as a component in the interactive system (e.g., the system can automatically download a friend network and create an interactive visualization). In one embodiment, the user is presented with an incentivized option to include an ad placement in the user's interactive media (e.g., the user is offered discounts, cash, or other incentives for including such ad placement(s) in his or her interactive media). For example, an ad placement can be based on the content of the interactive media (e.g., the media content itself and/or the associated metadata of the interactive media, such as the location of the created interactive media for placing local advertisements). At 66, the server system sends the user an email with a link to view, modify, and further share the interactive media from the interactive system. At 68, the user activates (e.g., clicks) the link to view a web page that allows the user to visualize, modify, comment on, and select options for sharing the interactive media from his or her experience with the interactive system with other users (e.g., other users 30 as described above with respect to the description of FIG. 1), devices (e.g., Internet connected devices 38 as described above with respect to the description of FIG. 1). At 70, if the media is selected for further sharing, then at 72 the server system shares the interactive media with social networks, other networks, other users, and/or other devices as selected by the user, and otherwise, the process terminates as shown.

Figure 3:
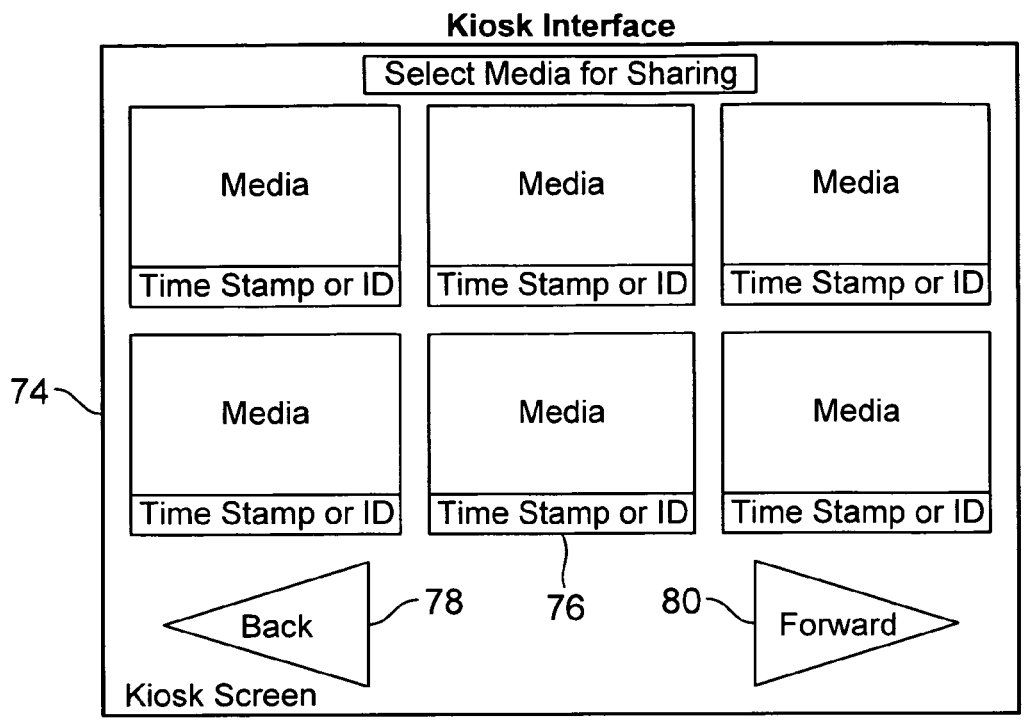
FIG. 3 is a block diagram illustrating an embodiment of a graphical user interface of a kiosk system for selecting interactive media to share using the kiosk system.

FIG. 3 is a block diagram illustrating an embodiment of a graphical user interface of a kiosk system and another graphical user interface of a server system for selecting interactive media to share using the kiosk system and the server system. As shown in FIG. 3, a graphical user interface (GUI) screen 74 (e.g., kiosk screen) of a kiosk allows a user to select interactive media on the kiosk (e.g., kiosk system 22 as described above with respect to the description of FIG. 1). For example, the interface for the kiosk screen can be a touch screen and/or another type of user interface, such as a pen, mouse, a trackball, joystick, keyboard, voice user interface, or other input devices. As shown, a user can browse and view interactive media 76 that is stored in the database of the kiosk system. Also as shown, to help identify the stored interactive media 76, the interactive media can be labeled with a time stamp and/or an identification tag (ID) that is stored in associated metadata. A user can browse previously recorded and stored interactive media on the kiosk by using a back button 78 and a forward button 80. For example, once the user locates the desired media, the user can select the media by touching, clicking, or pressing a button depending on the implementation of the kiosk interface.

Figure 4:
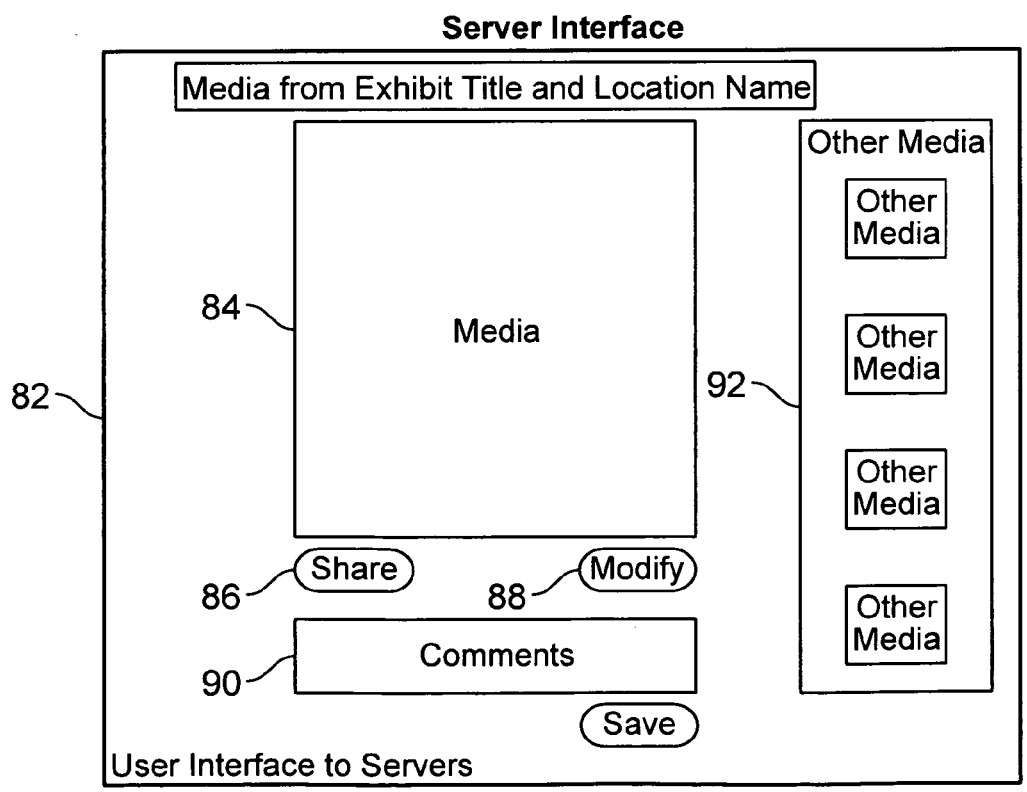
FIG. 4 is a block diagram illustrating an embodiment of a graphical user interface of a server system for viewing, commenting on, and modifying media using the server system.

FIG. 4 is a block diagram illustrating an embodiment of a graphical user interface of a server system for viewing, commenting on, and modifying media using the server system. As shown in FIG. 4, a GUI screen 82 (e.g., user interface to the server) of an interface for the server system (e.g., system of servers 40 as described above with respect to the description of FIG. 1) allows the user to view, comment, and modify the media using the server system. For example, the interface for the user interface to the system server can be a touch screen and/or another user interfaces, such as a pen, mouse, a trackball, joystick, keyboard, voice user interface, or other input devices. In one embodiment, user interface to the system server 82 is presented to the user as a hierarchical set of web pages accessible by the user through a standard web browser client. For example, a user can view, listen, and/or interact with media 84. A user can choose to share 86 the media and select specific options for sharing and downloading the media, which can be presented on a second GUI screen of the server system interface. A user can modify 88 the media, which can also be displayed on a separate screen of the server system interface that would present the user with options specific to the media type and the allowable modifications, such as, for example, adding graphics, audio, text, and editing the time line of the media. A user can choose to add comments 90 relating to his or her experience with the interactive system. A user can also view other media 92 that is related to them or the interactive media that was shared with them by other users.

Figure 5:
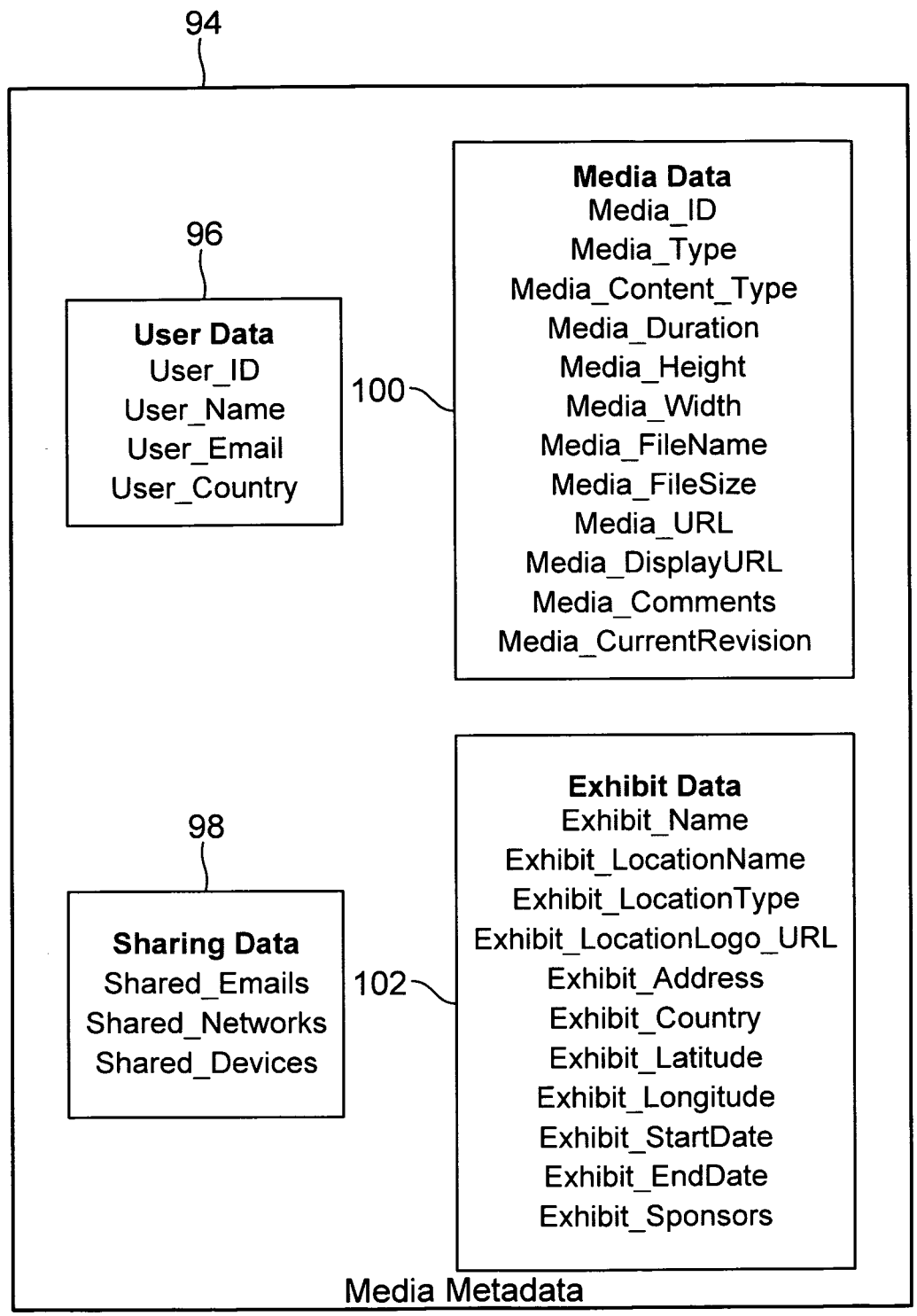
FIG. 5 is a block diagram illustrating an embodiment of metadata that is used to store details of the media, physical experience on the interactive system, and the user.

FIG. 5 is a block diagram illustrating an embodiment of metadata that is used to store details of the media, physical experience on the interactive system, and the user. As shown, media metadata 94 stores details of the user using the interactive system 96, details on how this media is shared 98, details of the media representing the physical experience 100, and details of the interactive system 102. For example, metadata 94 connects the physical experience of a user using an interactive system to the media that is a result of the experience. The following descriptions of the fields in the metadata are illustrative only and it is not required to collect data on all shown fields, and in one embodiment, different fields are used and/or not all of the shown fields are used. To associate the interactive media to the user, data about the user 96 is stored in several fields. Examples of such fields include an identification number or string, the name of the user, the email address of the user, and the country that the user is located in. In one embodiment, only the email address of the user is a required field to associate the interactive media to the user. In sharing data metadata 98, a history of how the interactive media has been shared can also be maintained with fields relating to email addresses of other users that the media was shared with, the social networks the media was shared with, and the devices the media was shared with, as shown. Data relating to the media 100 is stored to facilitate the visualization, identification, storage, commenting, and modification of the data. Examples of fields that relate to the interactive media include a media identification string or number, the media type (e.g., video, photo, audio, and/or other media), the media MIME type, the media duration, the media width and height, the media file name, the media file size, the media Uniform Resource Locator (URL) for accessing the media itself, the URL for the web page that allows a user to view, modify, and share the media, comments of the media, and the current revision number for modifiable media. Data relating to the interactive system 102 are stored to facilitate the association of the interactive media with the physical experience of interaction. Examples of fields relating to the physical interactive system include the name of the interactive system or exhibit featuring the interactive system, the name of the location or venue of the interactive system, the type of location (e.g., museum or store or other public or private space), a URL of the logo for the location or venue, the address of the location, the country, latitude, and longitude of the interactive system to facilitate visualizations of the location of the media, the start and stop date of the exhibition, and sponsors to the interactive system or exhibit.

Figure 6:
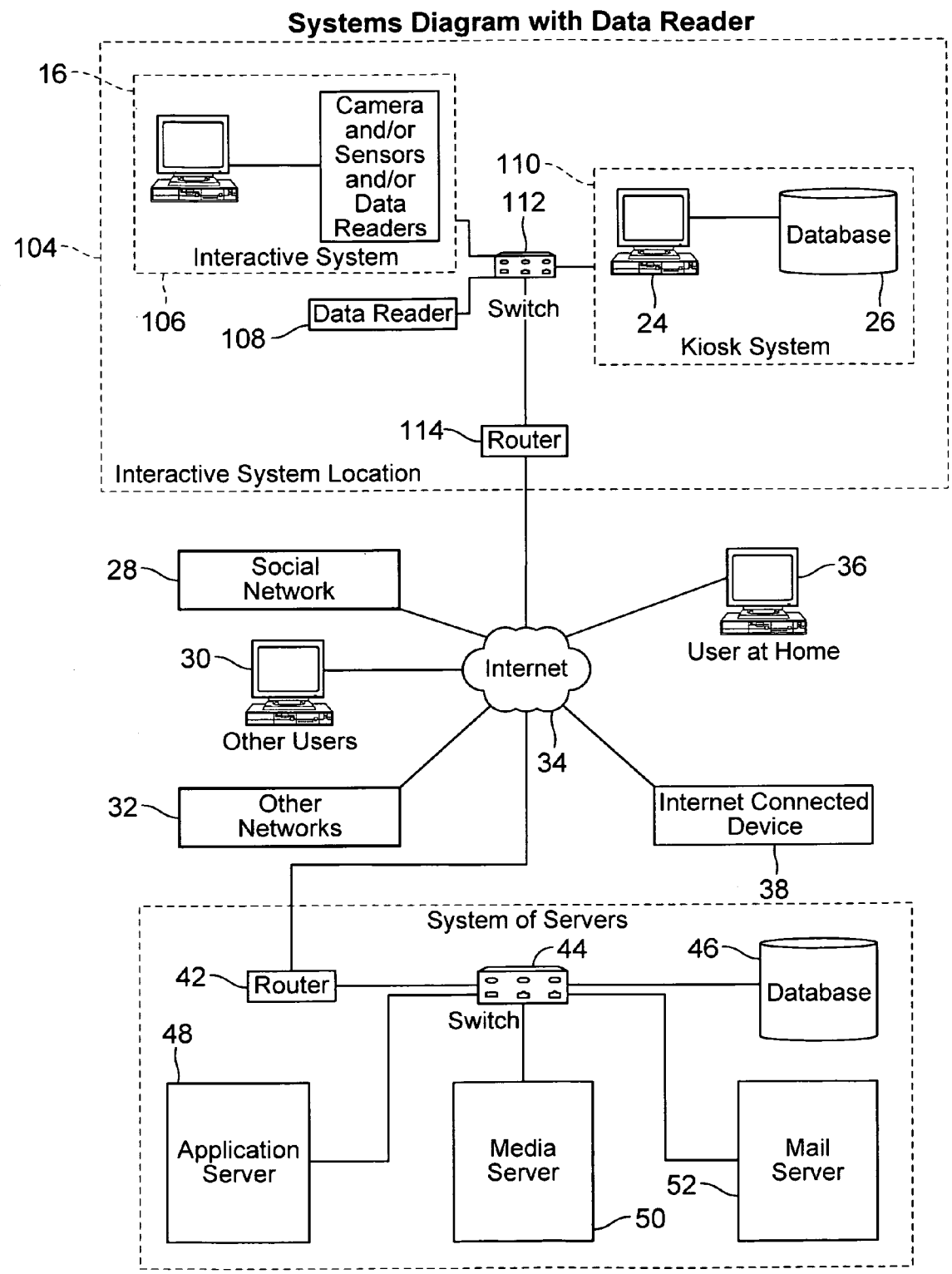
FIG. 6 is a block diagram illustrating an embodiment of a system with a data reader for an interactive system and kiosk system in network communication with a social network and a media playback device.

FIG. 6 is a block diagram illustrating an embodiment of a system with a data reader for an interactive system and kiosk system in network communication with a social network and a media playback device. As shown, FIG. 6 illustrates the system as described above with respect to FIG. 1 with the addition of a data reader 108, a switch 112, and a router 114 to the location of the interactive system 104. In one embodiment, data reader 108 can be a bar code reader, a magnetic card reader, a radio frequency identification reader (RFID), and/or a biometric reader (e.g., fingerprint or retinal recognition device), which can be used to collect information related to and/or identifying the user using interactive system 106 and/or kiosk system 110. The data from data reader 108 can be used to associate the user with data already stored in a database as well (e.g., user identity information stored in a database, such as, for example, a database accessible through a social network). In one embodiment, data collected from data reader 108 is stored in metadata fields associated with the user and/or the interactive media by kiosk system 110. Data collected from data reader 108, stored/maintained as metadata, and interactive media can be transferred by kiosk system 110 to the system server (e.g., system of servers 40 as described above with respect to FIG. 1).

Figure 7:
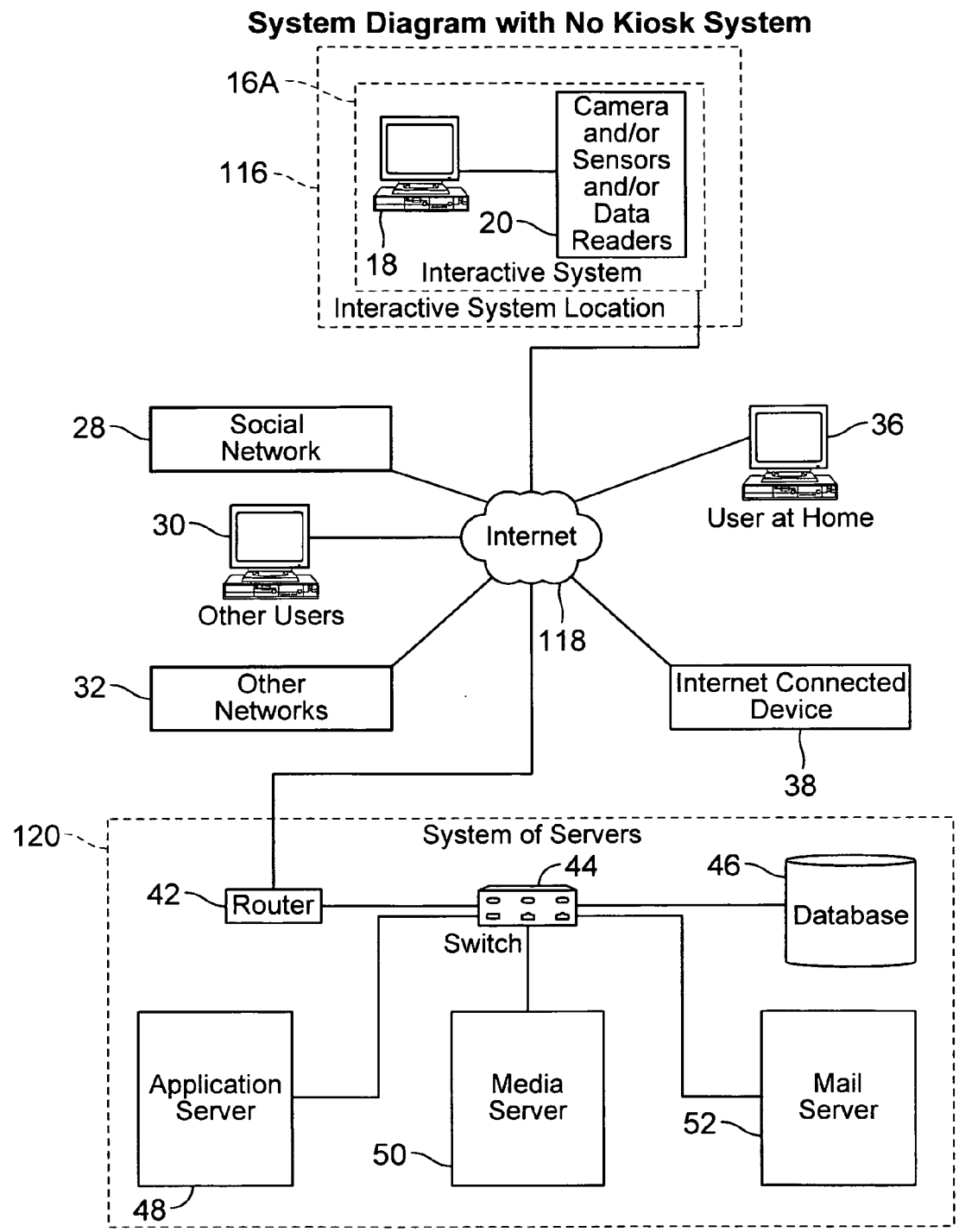
FIG. 7 is a block diagram illustrating an embodiment of a system for an interactive system in network communication with a system of servers.

FIG. 7 is a block diagram illustrating an embodiment of a system for an interactive system in network communication with a system of servers. As shown, in this embodiment of the system, there is not a separate kiosk system (kiosk 22 has been removed from the interactive system location 116 as shown in FIG. 7 and the system as described above with respect to FIG. 1). In this embodiment, the functionality, components, and access provided by kiosk system 22 are integrated into interactive system 16A, and interactive system 16A directly sends the encoded media and associated metadata (e.g., the interactive media) to system of servers 120. A user accesses a web page to choose the interactive media to share. The web page can be accessed from interactive system location 116 and/or the user's home 36 or other location that is connected to the Internet 118 (e.g., using Internet connected device 38). The link to the web page for accessing the media can be through a web page associated with the exhibit, venue, sponsor, or a central link for the system of servers. In one embodiment, the email address of the user can be collected using a data reader (e.g., data reader 108 as described above with respect to FIG. 6).

Figure 8:
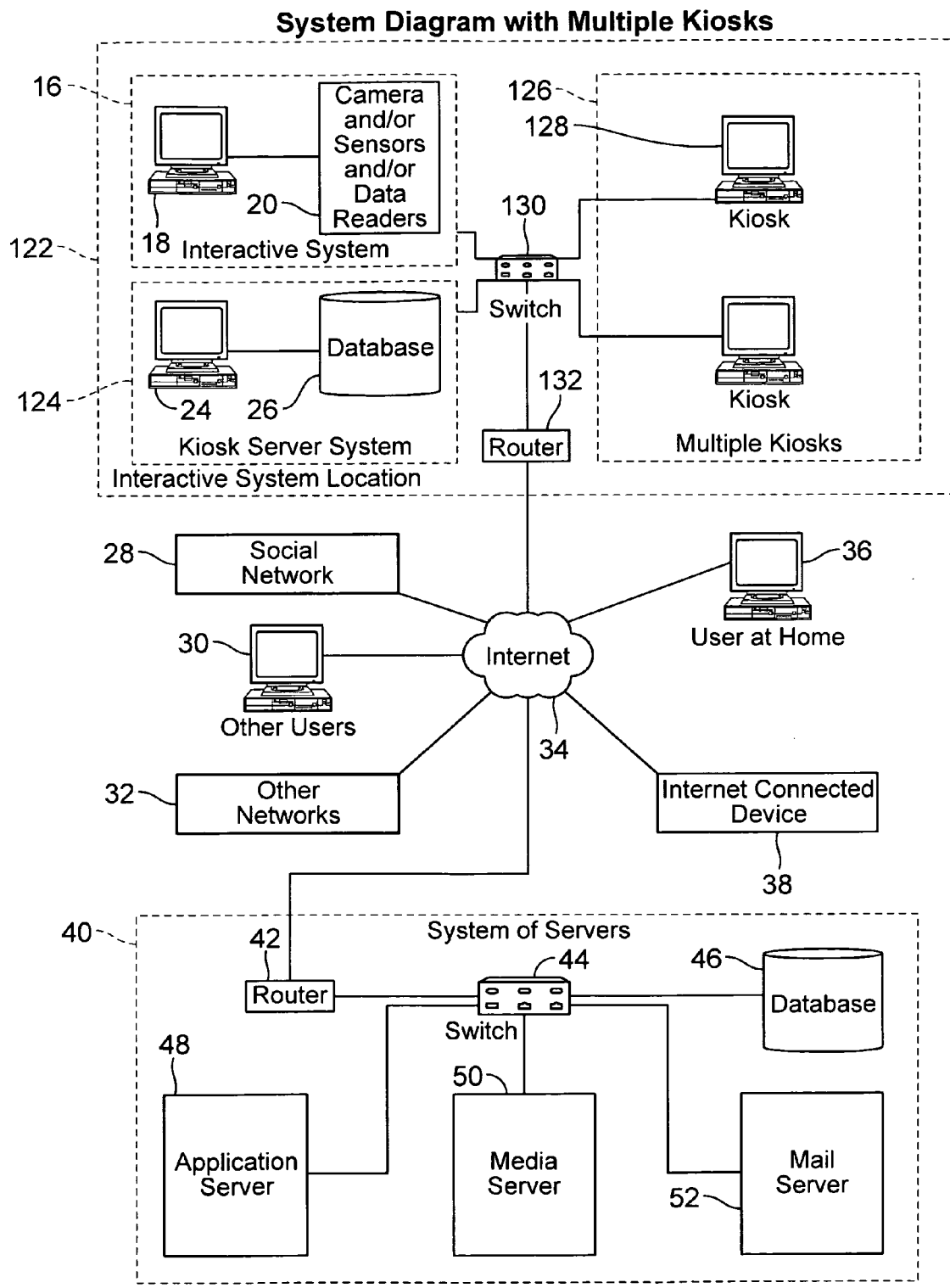
FIG. 8 is a block diagram illustrating an embodiment of a system for an interactive system and multiple kiosks connected to a single kiosk server system.

FIG. 8 is a block diagram illustrating an embodiment of a system for an interactive system and multiple kiosks connected to a single kiosk server system. As shown, in this embodiment, interactive media for sharing can be browsed and selected using multiple kiosks 126, including multiple kiosk computers 128, located at interactive system location 122. Multiple kiosks 126 allow multiple users to simultaneously browse and select interactive media for sharing. In one embodiment, multiple kiosks 126 allow multiple users to further interact, analyze, or visualize the data simultaneously. Interactive system 16, as described above with respect to FIG. 1, generates interactive media with associated metadata that is stored in kiosk server system 124. Kiosk server system 124 functions as an application server and database server for multiple kiosk computers 128. Multiple kiosk computers 128 access this database. In one embodiment, this kiosk server system 124 can be incorporated into one of the kiosk computers 128, or in another embodiment, each of the kiosk computers 128 contains a copy of the kiosk server system 124. Interactive media selected for sharing at a particular kiosk is transferred to system of servers 40 by kiosk server system 124. Also as shown, interactive system 16, kiosk server system 124, and multiple kiosks 126 are in network communication with each other via switch 130 and with the Internet 34 via router 132.

Figure 9:
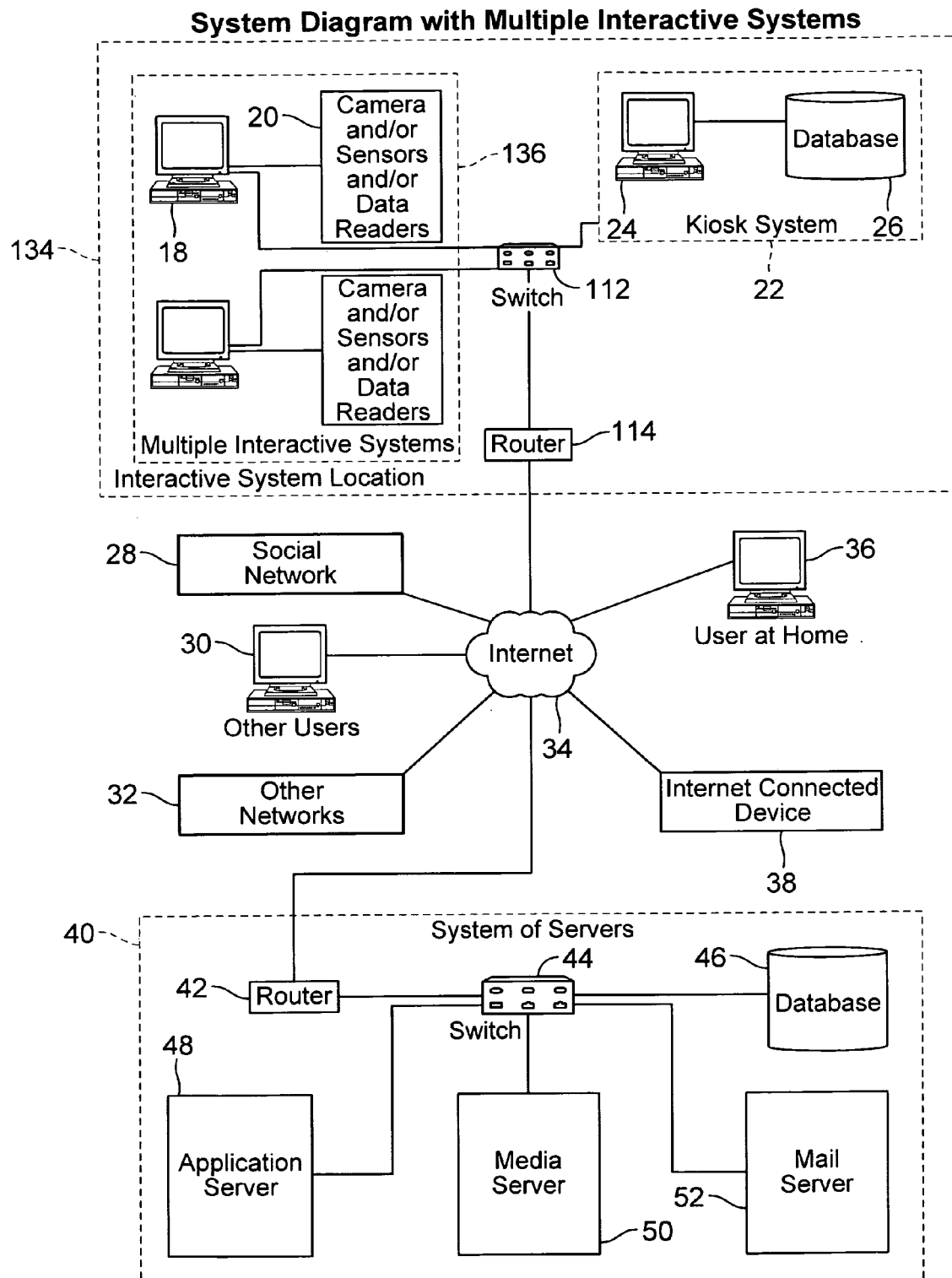
FIG. 9 is a block diagram illustrating an embodiment of a system for multiple interactive systems connected to a single kiosk system.

FIG. 9 is a block diagram illustrating an embodiment of a system for multiple interactive systems 136 connected to a single kiosk system 22. As shown, multiple interactive systems 136 at an interactive system location 134 interface with single kiosk system 22 via switch 112 and are in network communication with the Internet 34 via router 114. In one embodiment, multiple interactive systems 136 can be related by theme or function. The interactive media is stored in kiosk system 22 for browsing and selection by users, as similarly described above with respect to FIG. 1.

Figure 10:
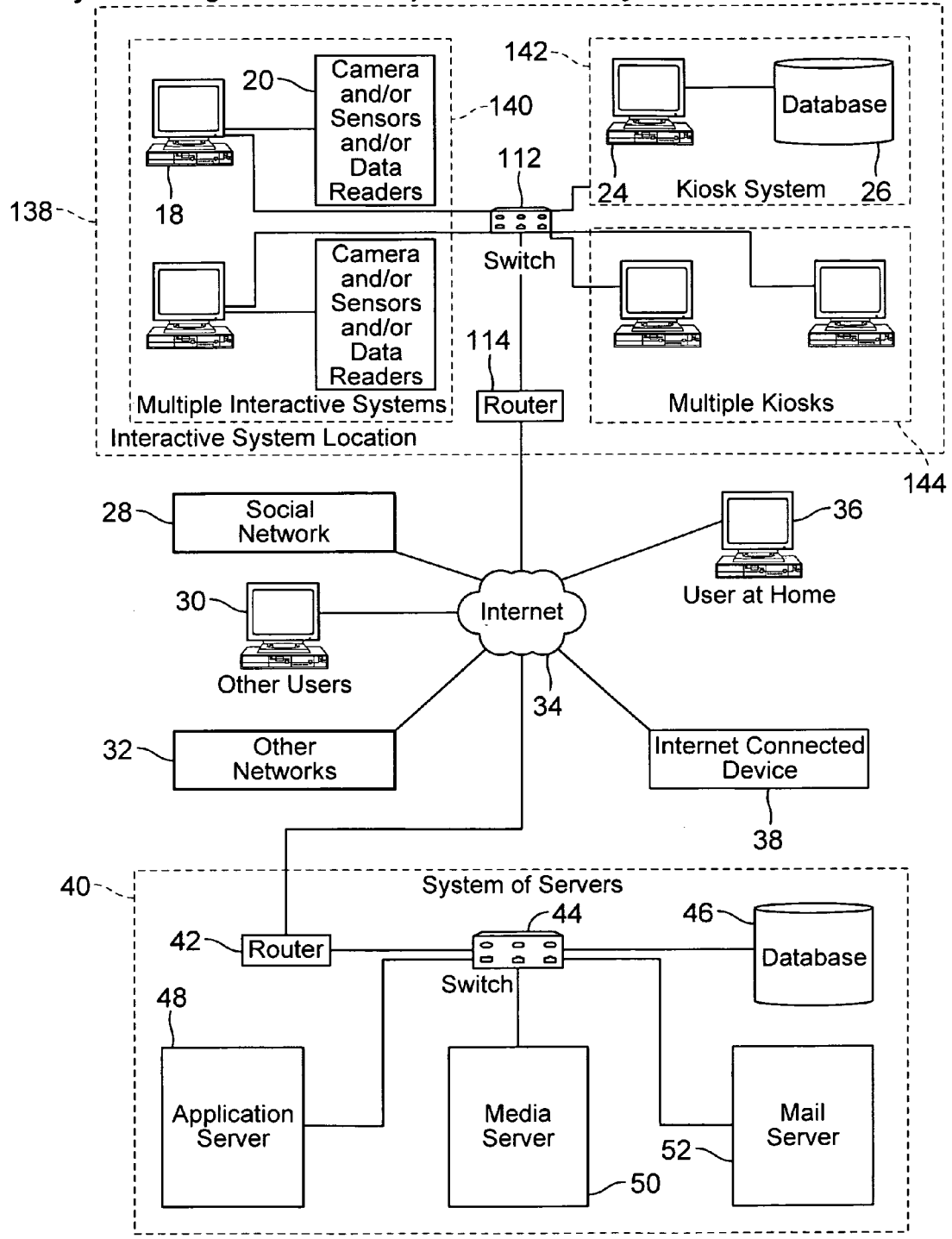
FIG. 10 is a block diagram illustrating an embodiment of a system for multiple interactive systems connected to a single kiosk server that connects to multiple kiosks.

FIG. 10 is a block diagram illustrating an embodiment of a system for multiple interactive systems 140 connected to a single kiosk server 142 (via switch 112) that connects to multiple kiosks 144. As shown, multiple interactive systems 140 at an interactive system location 138 interface with single kiosk system 142, and the interactive media for sharing can be browsed and selected using multiple kiosks 144, as similarly described above with respect to FIG. 1.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for generating and interacting with media content, the system including a processor and further comprising:
an unencumbered interactive media system that displays media content and monitors, interprets, responds, and records the interaction of an unencumbered user with the media content in a simulation, wherein the interactive system includes a first computer, a display, and a sensor for determining a user's unencumbered interaction with the displayed media content, including recording the user as a simulation within the media, interpreting, and storing the user's unencumbered interaction with the media content as metadata associated with the media content based on posture use, gesture use, position, and velocity, wherein the user's unencumbered interaction is recorded to provide a modified version of the simulation that includes the user's unencumbered interaction stored as interactive media content;
a kiosk that distributes interactive media content using a communication network, wherein the interactive media content includes the media content and metadata representing the user's recorded time usage and recorded interaction with the media content, including recorded postures, gestures, position, and velocity, and wherein the metadata representing the user's interaction is stored as the interactive media content that is searchable for sharing electronically the interactive media content with other users; and
wherein a social interaction of a plurality of users with each other and with the media content is captured as interactive media content that includes the media content and metadata representing the social interaction of the plurality of users with each other and with the media content, including recorded postures, gestures, features, position, and velocity, and wherein the metadata representing the plurality of users' social interaction with each other and with the media content is stored as interactive media content that is searchable for sharing electronically the interactive media content with other users.

2. The system of claim 1, wherein the metadata associated with the media content includes recording the user's time usage of unencumbered interaction with the media content.

3. The system of claim 1, wherein the kiosk allows the user to select interactive media content to share electronically with others.

4. The system of claim 1, wherein the interactive system is implemented as a first programmed computer, and the kiosk is implemented as a second programmed computer, wherein the kiosk is connected to the interactive system.

5. The system of claim 1, wherein the interactive system allows the user to interact with selected media content, and the interactive system records the user's interactions with the selected media content as interactive media content, and wherein the interactive media content is accessible by the kiosk for electronic distribution by the user to share the interactive media content with others.

6. The system of claim 1, wherein the interactive system allows the user to interact with selected media content, and the interactive system records the user's interactions with the selected media content as interactive media content, and wherein the interactive media content is accessible by the kiosk for electronic distribution by the user and for remote storage.

7. The system of claim 1, further comprising:
a data reader connected to the interactive system, wherein the data reader identifies information related to the user.

8. The system of claim 1, further comprising:
a data reader connected to the interactive system, wherein the data reader identifies information related to the user, wherein the data reader is selected from the group of a smart card reader, an RFID reader, a bar code reader, and a biometric reader, and wherein the system retrieves stored information related to the user.

9. The system of claim 1, further comprising:
a data reader in network communication with the interactive system, wherein the data reader identifies information related to the user, and wherein the system retrieves stored information related to the user from a social network.

10. The system of claim 1, further comprising:
a data reader in network communication with the interactive system, wherein the interactive system tracks usage data by a plurality of users of the system, and wherein the tracked usage data is transmitted for displaying online.

11. The system of claim 1, further comprising:
a data reader in network communication with the interactive system, wherein the interactive system tracks usage data by users of the system, wherein the tracked usage data is transmitted for displaying online, and wherein the tracked usage data includes data selected from the group of number of users, time usage per user, total time usage, level of activity by user interacting with media content, social interaction, posture use, gesture use, velocity, position, race, age, gender, user garment brand related data, user jewelry related data, and emotion of users interacting with media content.

12. The system of claim 1, further comprising:
a data reader in network communication with the interactive system, wherein the interactive system tracks usage data by users of the system, wherein the tracked usage data is transmitted for displaying online, wherein the tracked usage data includes data selected from the group of number of users, time usage per user, total time usage, time usage with specific media content by a user, level of activity by user interacting with media content, choices and or user profiles selected by the user, interaction outcome, social interaction, posture use, gesture use, velocity, position, race, age, gender, user garment brand related data, user jewelry related data, and emotion of users interacting with media content, and wherein the tracked usage data is stored as metadata associated with the interactive media content.

13. The system of claim 1, wherein the sensor is selected from the group of a camera, a microphone, a tactile sensor, a heat sensor, and a motion sensor.

14. The system of claim 1, further comprising:
a plurality of interactive systems, wherein the kiosk interfaces the plurality of interactive systems with each other and for electronic distribution of the interactive media content.

15. The system of claim 1, further comprising:
a plurality of kiosks, wherein the interactive system interfaces with the plurality of kiosks.

16. The system of claim 1, wherein the distribution of interactive media content using a communication network includes electronic distribution via a plurality of communication networks selected from one or more of the following communication networks: a television network, a cable television, a satellite network, a public switched telephone network, a cellular telephone network, an online gaming network, a multiplayer virtual world network, a local area computer network, a wide area computer network, and the Internet.

17. The system of claim 1, wherein the electronic distribution includes communication via electronic mail, multimedia message, uploading to a social network, and uploading to a media server.

18. The system of claim 1, wherein the kiosk transmits the user's generated interactive media content to a media server for storage and distribution.

19. The system of claim 1, wherein the interactive media content includes sensed data related to the user and the user's environment.

20. The system of claim 1, wherein interactive media content is selected from the group of interactive video, user created video with an audio mix, tactile data, a video game, a music video, computer graphic data, a digital photograph, a data visualization, environmental data, and recorded brain wave signals data.

21. The system of claim 1, wherein the interactive media content includes an advertisement.

22. The system of claim 1, wherein the interactive media content includes an ad placement selected by the user, and wherein the user receives an incentive for the ad placement in the user's generated interactive media content.

23. The system of claim 1, wherein the interactive media content includes metadata, the metadata including information related to the user, the media content, and a geographical location where the interactive media content was created.

24. The system of claim 1, wherein the interactive media content includes metadata, the metadata including information related to the user, the media content, a geographical location where the interactive media content was created, and wherein the metadata is used for searching the interactive media content.

25. The system of claim 1, wherein the interactive media content includes metadata, the metadata including information related to the user, the media content, a geographical location of where the interactive media content was created, and wherein the metadata is used for placing advertisements with the interactive media content.

26. The system of claim 1, wherein the interactive media content includes metadata, the metadata includes information based on automatically determined user or environment related information, and wherein the metadata is used for placing advertisements with the interactive media content.

27. The system of claim 1, wherein the interactive media content includes metadata, the metadata including information related to a location of the creation of the interactive media content, and wherein the metadata is used for placing local advertisements with the interactive media content.

28. The system of claim 1, wherein an API is provided for searching stored interactive media content.

29. The system of claim 1, wherein an API is provided for uploading interactive media content.

30. A method for generating and interacting with media content, comprising:
   displaying media content, wherein the media content is displayed using an interactive system;
   monitoring, interpreting, and responding to a user's unencumbered interaction with the media content in a simulation using a processor;
   recording the user's unencumbered interaction with the displayed media content, wherein the user's interaction is recorded using the interactive system that includes a first computer and a sensor for determining a user's interaction with the displayed media content, including recording, interpreting, and storing the user's unencumbered interaction with the media content based on posture use, gesture use, position, and velocity, wherein the user's unencumbered interaction is recorded to provide a modified version of the simulation that includes the user's unencumbered interaction stored as interactive media content;
   distributing the interactive media content associated with the user using a communication network, wherein the interactive media content includes the media content and metadata representing the user's recorded time usage and recorded unencumbered interaction with the media content as metadata associated with the media content, including recorded postures, gestures, position, and velocity, and wherein the metadata representing the user's unencumbered interaction is stored as interactive media content that is searchable for sharing electronically the interactive media content with other users; and
   wherein a social interaction of a plurality of users with each other and with the media content is captured as interactive media content that includes the media content and metadata representing the social interaction of the plurality of users with each other and with the media content, including recorded postures, gestures, features, position, and velocity, and wherein the metadata representing the plurality of users' social interaction with each other and with the media content is stored as interactive media content that is searchable for sharing electronically the interactive media content with other users.

31. The method of claim 30, wherein the metadata associated with the media content includes recording the user's time usage of unencumbered interaction with the media content.

32. The method of claim 30, further comprising:
   distributing the interactive media associated with the user based on a selection by the user for sharing the interactive media using a social network.

33. The method of claim 30, further comprising:
   distributing the interactive media associated with the user based on a selection by the user for sharing the interactive media with other users.

34. The method of claim 30, further comprising:
   distributing the interactive media associated with the user based on a selection by the user for sharing the interactive media with other network connected devices.

35. The method of claim 30, further comprising:
   receiving an email address of the user associated with the interactive media;
   sending the user an email including a link to access the interactive media; and
   allowing the user to select options to view, modify, and share the interactive media.

36. The method of claim 30, further comprising:
   determining information related to the user using a data reader.

37. The method of claim 30, further comprising:
   determining information related to the user using a data reader; and
   retrieving stored information related to the user.

38. The method of claim 30, further comprising:
   determining information related to the user using a data reader; and
   retrieving stored information related to the user from a social network.

39. The method of claim 30, further comprising:
tracking usage data by a plurality of users of the system; and
transmitting the usage data for displaying online, wherein the usage data includes data selected from the group of number of users, time usage per user, total time usage, time usage with specific media content by a user, level of activity by user interacting with media content, choices and or user profiles selected by the user, interaction outcome, social interaction, posture use, gesture use, position, velocity, race, age, gender, user garment brand related data, user jewelry related data, and emotion of users interacting with media content.

40. The method of claim 30, further comprising:
uploading the interactive media to a media server.

41. The method of claim 30, wherein the interactive media content includes sensed data related to the user and the user's environment.

42. The method of claim 30, wherein interactive media content is selected from the group of interactive video, user created video with an audio mix, tactile data, a video game, a music video, computer graphic data, a digital photograph, a data visualization, environmental data, and recorded brain wave signals data.

43. The method of claim 30, further comprising:
placing an advertisement approved by the user in the interactive media content, wherein the user receives an incentive for the ad placement in the user's interactive media content.

44. The method of claim 30, wherein the interactive media content includes metadata, the metadata including information related to the user, the media content, and a geographical location where the interactive media content was created.

45. The method of claim 30, wherein the interactive media content includes metadata, the metadata including information related to the user, the media content, a geographical location where the interactive media content was created, and wherein the metadata is used for searching the interactive media content.

46. The method of claim 30, wherein the interactive media content includes metadata, the metadata including information related to the user, the media content, a geographical location of where the interactive media content was created, and wherein the metadata is used for placing advertisements with the interactive media content.

47. The method of claim 30, further comprising:
searching stored interactive media content using an API.

48. The method of claim 30, further comprising:
uploading the interactive media content using an API.

49. A computer program product for generating and interacting with media content, the computer program product being embodied in a non-transitory computer readable storage medium and comprising computer instructions for:
displaying media content, wherein the media content is displayed using an interactive system;
monitoring, interpreting, and responding to a user's unencumbered interaction with the media content in a simulation;
recording the user's unencumbered interaction with the displayed media content, wherein the user's interaction is recorded using the interactive system that includes a first computer and a sensor for determining a user's interaction with the displayed media content, including recording, interpreting, and storing the user's unencumbered interaction with the media content based on posture use, gesture use, position, and velocity, wherein the user's unencumbered interaction is recorded to provide a modified version of the simulation that includes the user's unencumbered interaction stored as interactive media content;
distributing the interactive media content associated with the user using a communication network, wherein the interactive media content includes the media content and metadata representing the user's recorded time usage and recorded unencumbered interaction with the media content as metadata associated with the media content, including recorded postures, gestures, position, and velocity, and wherein the metadata representing the user's unencumbered interaction is stored as interactive media content that is searchable for sharing electronically the interactive media content with other users; and
wherein a social interaction of a plurality of users with each other and with the media content is captured as interactive media content that includes the media content and metadata representing the social interaction of the plurality of users with each other and with the media content, including recorded postures, gestures, features, position, and velocity, and wherein the metadata representing the plurality of users' social interaction with each other and with the media content is stored as interactive media content that is searchable for sharing electronically the interactive media content with other users.

50. The computer program product recited in claim 49, wherein the metadata associated with the media content includes recording the user's time usage of unencumbered interaction with the media content.

51. The computer program product recited in claim 49 further comprising computer instructions for:
distributing the interactive media associated with the user based on a selection by the user for sharing the interactive media using a social network.

52. The computer program product recited in claim 49 further comprising computer instructions for:
distributing the interactive media associated with the user based on a selection by the user for sharing the interactive media with other users.

53. The computer program product recited in claim 49 further comprising computer instructions for:
distributing the interactive media associated with the user based on a selection by the user for sharing the interactive media with other network connected devices.

54. The computer program product recited in claim 49 further comprising computer instructions for:
receiving an email address of the user associated with the interactive media;
sending the user an email including a link to access the interactive media; and
allowing the user to select options to view, modify, and share the interactive media.

55. The computer program product recited in claim 49 further comprising computer instructions for:
determining information related to the user using a data reader.

56. The computer program product recited in claim 49 further comprising computer instructions for:
determining information related to the user using a data reader; and
retrieving stored information related to the user.

57. The computer program product recited in claim 49 further comprising computer instructions for:
determining information related to the user using a data reader; and
retrieving stored information related to the user from a social network.

58. The computer program product recited in claim 49 further comprising computer instructions for:

tracking usage data by a plurality of users of the system; and transmitting the usage data for displaying online, wherein the usage data includes data selected from the group of number of users, time usage per user, total time usage, time usage with the media content by the user, level of activity by user interacting with media content, choices and or user profiles selected by the user, interaction outcome, social interaction, posture use, gesture use, velocity, position, race, age, gender, user garment brand related data, user jewelry related data, and emotion of users interacting with media content.

59. The computer program product recited in claim 49 further comprising computer instructions for:

uploading the interactive media to a media server.

60. The computer program product recited in claim 49, wherein the interactive media content includes sensed data related to the user and the user's environment.

61. The computer program product recited in claim 49, wherein interactive media content is selected from the group of interactive video, user created video with an audio mix, tactile data, a video game, a music video, computer graphic data, a digital photograph, a data visualization, environmental data, and recorded brain wave signals data.

62. The computer program product recited in claim 49 further comprising computer instructions for:

placing an advertisement approved by the user in the interactive media content, wherein the user receives an incentive for the ad placement in the user's interactive media content.

63. The computer program product recited in claim 49, wherein the interactive media content includes metadata, the metadata including information related to the user, the media content, and a geographical location where the interactive media content was created.

64. The computer program product recited in claim 49, wherein the interactive media content includes metadata, the metadata including information related to the user, the media content, a geographical location where the interactive media content was created, and wherein the metadata is used for searching the interactive media content.

65. The computer program product recited in claim 49, wherein the interactive media content includes metadata, the metadata including information related to the user, the media content, a geographical location of where the interactive media content was created, and wherein the metadata is used for placing advertisements with the interactive media content.

66. The computer program product recited in claim 49 further comprising computer instructions for:

searching stored interactive media content using an API.

67. The computer program product recited in claim 49 further comprising computer instructions for:

uploading the interactive media content using an API.

\* \* \* \* \*